United States Patent [19]

Weber et al.

[11] 3,851,388
[45] Dec. 3, 1974

[54] DETACHABLE BLADE ASSEMBLY FOR GRASS SHEAR

[76] Inventors: Edwin Joseph Weber, 2304 Ellen Ave., Baltimore, Md. 21234; Ralph James Secoura, 5201 Disney Ave., Baltimore, Md. 21225

[22] Filed: June 19, 1973

[21] Appl. No.: 371,404

[52] U.S. Cl..................... 30/223, 30/DIG. 1, 56/300
[51] Int. Cl............................................. B26b 19/06
[58] Field of Search ............ 30/216, 221, 222, 223, 30/224, 210, 228, DIG. 1; 56/296, 300

[56] References Cited
UNITED STATES PATENTS

| | | | |
|---|---|---|---|
| 2,540,616 | 2/1951 | Hasslacher........................ | 30/223 X |
| 3,314,149 | 4/1967 | Kobler................................. | 30/222 |
| 3,460,250 | 8/1969 | Liska .................................. | 30/221 |
| 3,747,594 | 7/1973 | Bishop............................. | 30/228 X |

*Primary Examiner*—Al Lawrence Smith
*Assistant Examiner*—J. C. Peters
*Attorney, Agent, or Firm*—Joseph R. Slotnik; Leonard Bloom; Edward D. Murphy

[57] ABSTRACT

A cordless electric grass shear comprising a housing assembly encasing and supporting an electric motor and battery means therefor, the housing assembly having a handle provided with switch operating means. The motor is connected to a power train having an output oscillating member. An improved cartridge blade assembly, including stationary and reciprocable toothed blades, is detachably secured to means on the housing, and the output oscillating member operatively engaged with the reciprocable blade to move the latter. The detachable blade assembly includes means guiding and maintaining the proper cutting relationship between the blades for efficient operation of the device. Furthermore, the detachable blade assembly is quickly and easily removable and replaceable without requiring special tools, and is constructed for optimum safety and reliability in use.

1 Claim, 9 Drawing Figures

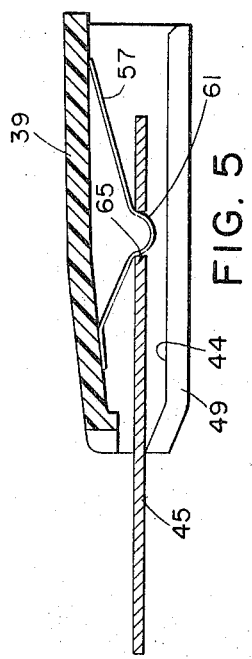
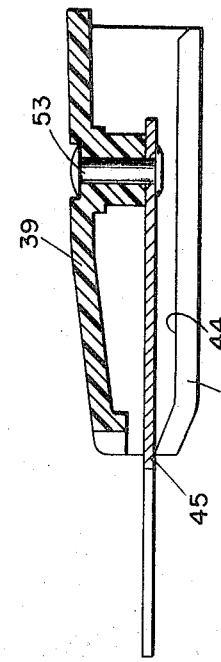
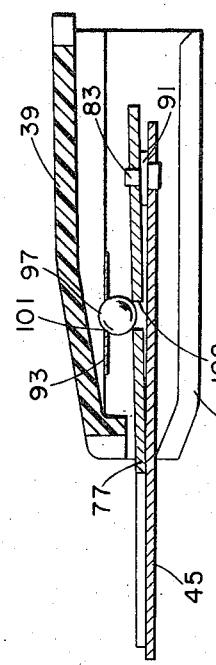
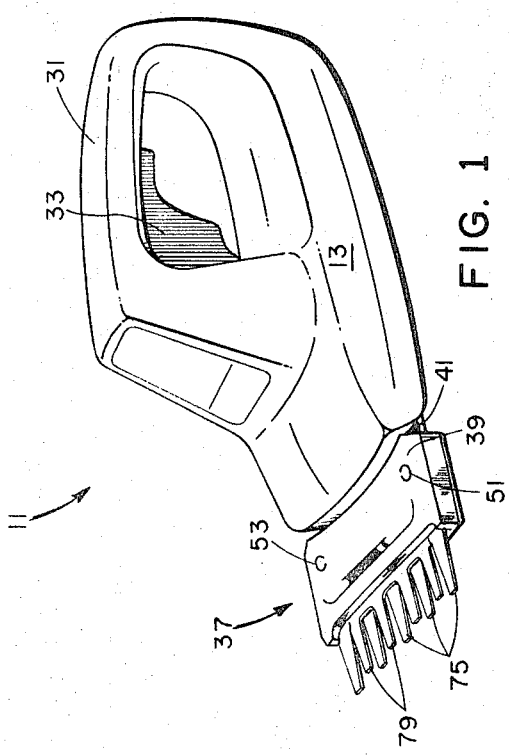
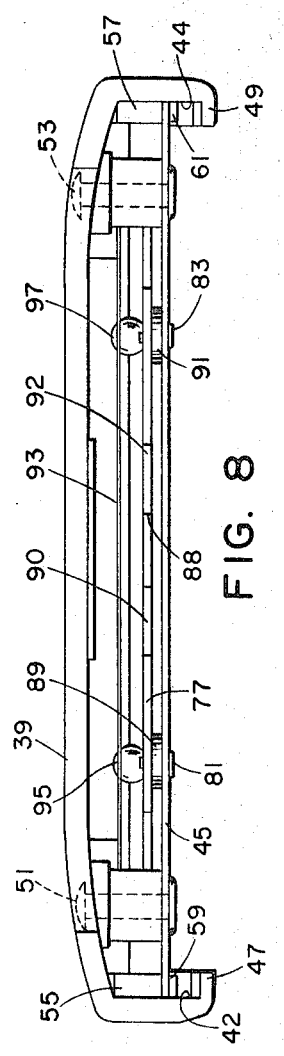

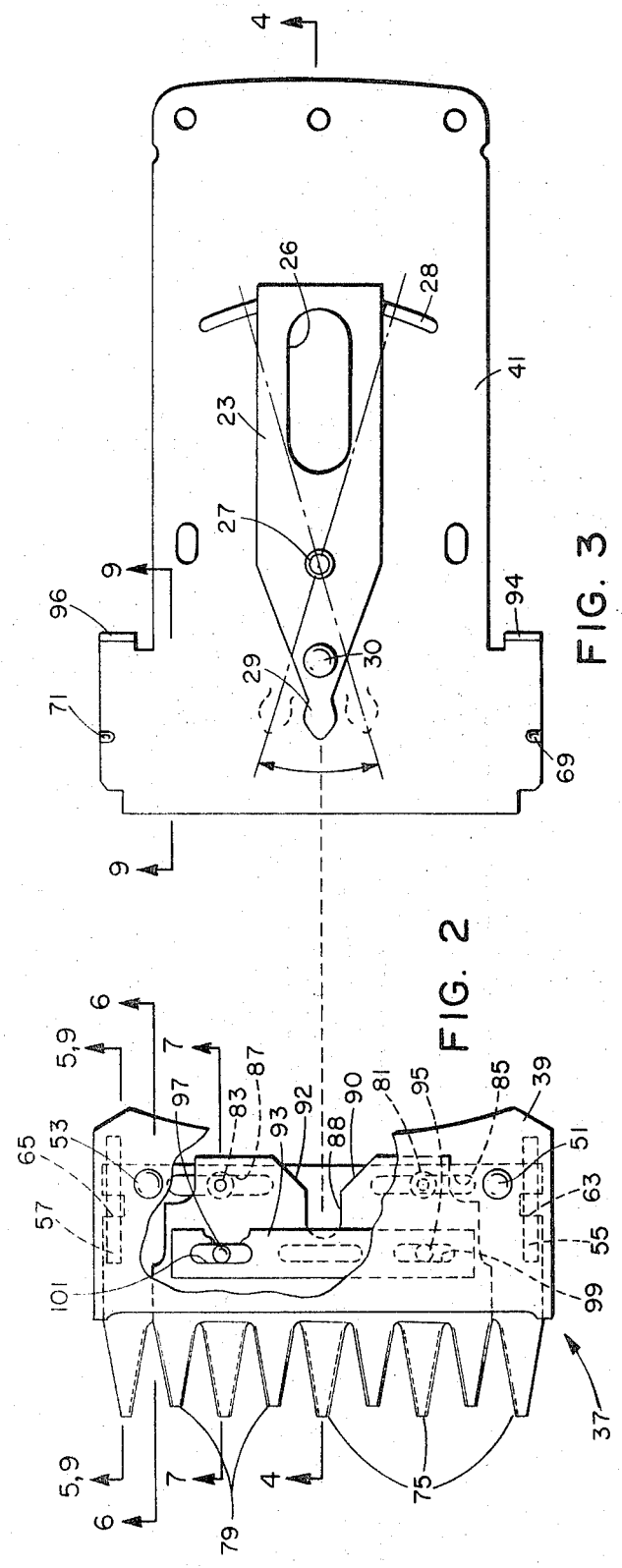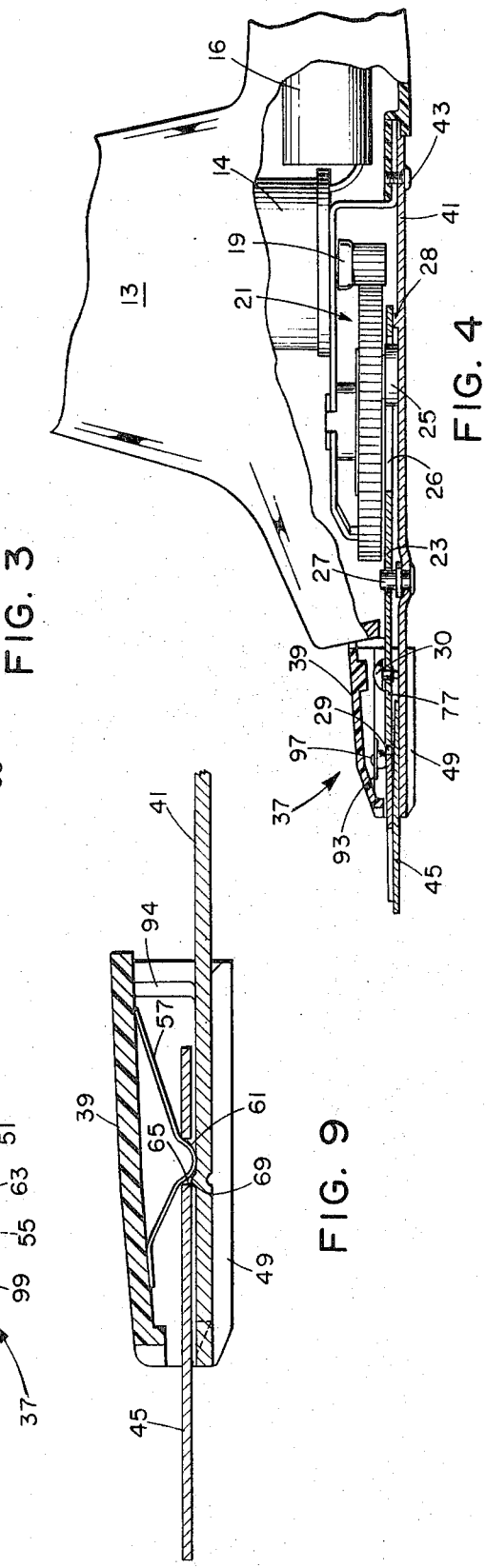

DETACHABLE BLADE ASSEMBLY FOR GRASS SHEAR

SUMMARY OF THE INVENTION

The present invention is directed to an improved, detachable, blade assembly for electric grass shears and like devices wherein the blade asembly is a self-contained, cartridge like arrangement including a stationary toothed blade and a laterally reciprocating toothed blade, the blades being relatively stiff and inflexible and resiliently maintained in optimum cutting relation by means incorporated in the cartridge assembly, wherein the cartridge assembly is quickly and easily detachably secured to means on a housing enclosing an electric motor and power train having an oscillating, reciprocating or rotating output member, wherein the cartridge assembly includes blades cooperable in a manner to minimize friction, and wherein when the cartridge blade assembly is secured in place on the tool housing, the power train output member is automatically engaged in driving relation with the reciprocating blade.

In accordance with the invention, the detachable blade assembly is secured to and removed from the tool housing without the need of any special tools, and, when assembled, provides a secure construction which optimizes safety in handling and using the device.

Furthermore, the cartridge blade assembly incorporates virtually all the parts subject to wear in use of the device, so that the replaceable arrangement minimizes the time and expense required for servicing the device.

Other advantages in the present invention arise from a detachable blade assembly constructed for use with a portable, power operated grass shear and like devices, the blade assembly and the attached device including a relatively inexpensive construction as well as one which is easily manufactured, and one which is reliable and efficient as well as safe in use.

Additional objects and advantages of the present invention will become more apparent from a consideration of the detailed description to follow, taken in conjunction with the drawings annexed hereto.

BRIEF DESCRIPTION OF THE DRAWINGS

FIG. 1 is a perspective view showing a portable, cordless electric grass shear incorporating the present invention;

FIG. 2 is a plan view of a cartridge blade assembly embodying a preferred form of the invention shown detached from the grass shear housing and with parts broken away for clarity;

FIG. 3 is a plan view of a bottom plate and driving arm carried by the grass shear housing and engageable with the cartridge blade assembly of the present invention;

FIG. 4 is a view partially in section and partially in elevation of the assembled grass shear taken substantially along the line 4—4 of FIGS. 2 and 3;

FIG. 5 is an enlarged sectional view taken along the line 5—5 of FIG. 2;

FIG. 6 is an enlarged sectional view taken along the line 6—6 of FIG. 2;

FIG. 7 is an enlarged sectional view taken along the line 7—7 of FIG. 2;

FIG. 8 is a rear view of the cartridge blade assembly shown in FIG. 2; and

FIG. 9 is an enlarged sectional view of FIGS. 2 and 3 taken along the line 9—9 thereof.

DETAILED DESCRIPTION

Referring now more specifically to the drawings, FIG. 1 shows an illustrative portable, cordless, electric grass shear 11 incorporating a detachable blade assembly embodying the present invention. It will be understood, however, that the illustrated grass shear is for purposes of describing a manner of practicing the invention. Other types of devices may also find use in combination with the present invention. Such devices could include, but are not limited to, other types of shears including hedge shears, corded electric devices, gasoline powered devices, and stand-up and wheeled type devices.

With this in mind, the illustrated grass shear includes a housing 13 enclosing an electric motor 14 powered by battery means 16. The motor includes an output shaft 19 connected through a gear train 21 to an oscillating arm 23. As shown, the gear train 21 includes a rotating crank 25 engaged in a slot 26 in one end of the arm 23, the latter having an intermediate pivot connection by rivet 27 to a base plate 41, and an output end 29 extending forwardly of the housing 13. A raised arcuate ledge 28 on the base plate 41 reduces drag between arm 23 and base plate 41. In addition, ledge 28 and a rivet 30 on arm 23 properly position arm end 29 during assembly of the cartridge blade assembly as will be described. A handle 31 is formed on the housing 13 and is provided with a trigger 33 for controlling on/off operation of the device. Suitable locking means (not shown) may be interconnected with the trigger 33 to reduce the likelihood of inadvertant or accidental operation of the device.

A cartridge blade assembly, generally indicated at 37, is constructed for detachable connection to the housing 13 adjacent the output end 29 of the arm 23. The blade assembly 37 includes a blade housing 39 adapted to slidably embrace the forward end of the base plate 41 secured to the housing 13 by screws 43. The forward end of base plate 41 extends into ways 42, 44 formed between a stationary blade 45 and return bent ears 47, 49 on the blade housing 39 (See FIG. 8). The stationary blade 45 is secured to the blade housing 39 by rivets 51, 53 and locates a pair of leaf type springs 55, 57 having arcuate segments 59, 61 projecting through openings 63, 65, respectively in the stationary blade 45. (See also FIGS. 2, 5 and 9). The base plate 41 includes raised projections 69, 71 (FIGS. 3 and 9) which cooperatively engage, in detent-like fashion, with the arcuate spring segments 59, 61 as shown in FIG. 9 to releasably retain the cartridge 37 in place on the base plate 41 and connected to tool 11.

The stationary blade 45 extends forwardly of the blade housing 39 and is provided with a plurality of spaced, forwardly extending teeth 75. A movable blade 77 is slidably supported atop the blade 45 and has a plurality of similary shaped teeth 79 cooperating in shearing relationship with the teeth 75. The moving blade 77 has a central opening 88 disposed to receive the output end 29 of arm 23 when the cartridge 37 is assembled to base plate 41. Desirably, tapered surfaces 90, 92 on either side of opening 88 cammingly engage arm end 29 and assist is aligning the blade 77 and arm 23 during assembly. The blade 77 also has a pair of guide pins 81, 83 secured thereto and slidably guided in transversely elongated slots 85, 87 formed in the stationary blade 45 to guide the blade 77 in reciprocation relative to blade 45. In addition, the pins 81, 83 each have an intermediate radial flange 89, 91 to maintain the inner ends of the blades 45, 77 spaced as shown in FIGS. 7 and 8.

The moving blade 77 is resiliently biased toward the stationary blade 45 by means of a bowed leaf spring 93 carried within the blade housing 39. As shown, the spring 93 has transversely elongated slots 99, 101 in which are disposed the upper portions of steel balls 95, 97. The moving blade 77 is provided with similar slots 100, 102 which receive the lower portions of balls 95, 97. Thus, when the blade 77 is reciprocated transversely relating to blade 45, the balls 95, 97 in slots 99, 100 and 101, 102, respectively, and thereby minimize friction between the parts.

The biasing action of the spring 93 through balls 95, 97 on the intermediate portion of the blade 77, together with the the action of the pins 85, 87, which maintain the rearward or inner ends of the blades 77, 45 spaced, causes the teeth 75, 79 at the forward ends of the relative stiff, inflexible blades 45, 77 to cooperate in scissor like fashion. This is so since the blades 45, 77 are angled toward one another at their forward, toothed ends as shown in FIG. 7. The scissor like cutting action described is advantageous in that it is an efficient and effective shearing action on grass and the like. However, as distinguished from scissor like cutting action between blades one or both of which are flexible and bowed toward each other, the action described herein, namely, the biasing action of a separate spring on relatively stiff blades, is better controlled. This can result in lower frictional forces and is especially advantageous in cordless tools such as the one shown, since battery life is directly dependent upon friction.

To assemble the cartridge 37 to the tool 11, the blade 77 is moved, if necessary, to approximately align opening 88 with arm end 29. Thereafter, the base plate 41 is slid into the ways 42, 44 until projections 69, 71 cam past the spring segments 59, 61, and upturned ears 94, 96 on base plate 41 engage the rear end of housing 39. In this position, arm end 29 is positioned in opening 88, rivet 30 insuring that arm end 29 is properly elevated for entry into opening 88, so that when the tool 11 is turned on, oscillation of arm 23 causes blade 77 to reciprocate relative to blade 45.

To remove the cartridge 37 from the base plate 41, it is only necessary to pull the blade housing 39 away from the tool housing assembly 13 so that the raised projections 69, 71 on the base plate 41 cam the arcuate spring segments 59, 61 upwardly.

It will be appreciated that all the moving blade parts are contained in the cartridge 37 so that when a blade part wears and/or requires replacement, it is a relatively simple job to remove and replace the entire cartridge, this being achieved without the need for any special tools or the like. Furthermore, the cartridge includes all the springs and connectors, there only being the raised projections 69, 71 on the base plate 41 associated with the tool itself. This base plate, however, is not subject to wear and need not be replaced.

By the foregoing, there has been disclosed an improved, detachable blade assembly for grass shears and the like calculated to fulfill the inventive objects hereinabove set forth. While a preferred embodiment of the present invention has been illustrated and described in detail herein, it will be appreciated that various additions, substitutions, modifications and omissions may be made thereto without departing from the spirit of the invention.

We claim:

1. A cartridge blade assembly for a power operated, shear device, said blade assembly including a blade housing having a stationary blade secured thereto, said stationary blade having laterally spaced, shearing teeth extending forwardly of said housing, a movable blade slidably guided on said stationary blade, said movable blade having laterally spaced, shearing teeth substantially overlaying the shearing teeth on said stationary blade, said blades being relatively inflexible and inclined toward one another so that said shearing teeth intersect one another, means normally biasing said blades toward said inclined, shearing relation, said means including an elongated leaf-type spring carried by and extending transversely of said housing, a plurality of balls between said spring and said movable blade, said spring and said movable blade being provided with transverse recesses receiving and retaining each of said balls in lateral rolling relation, said spring acting through said balls to bias said movable blade toward said stationary blade, whereby to maintain said cutting teeth in shearing relation and minimize friction between the parts.

* * * * *

UNITED STATES PATENT OFFICE
CERTIFICATE OF CORRECTION

Patent No. 3,851,388                    Dated December 3, 1974

Inventor(s)  Edwin Joseph Weber, Ralph James Secoura

It is certified that error appears in the above-identified patent and that said Letters Patent are hereby corrected as shown below:

On the Abstract sheet, Column 1, between lines 6 and 7, insert:

Assignee: The Black and Decker Manufacturing Company, Towson, Maryland.

Signed and sealed this 18th day of March 1975.

(SEAL)
Attest:

RUTH C. MASON
Attesting Officer

C. MARSHALL DANN
Commissioner of Patents
and Trademarks